US012030367B2

(12) United States Patent
Kim et al.

(10) Patent No.: US 12,030,367 B2
(45) Date of Patent: Jul. 9, 2024

(54) HEAT PUMP SYSTEM FOR VEHICLE

(71) Applicants: Hyundai Motor Company, Seoul (KR); Kia Corporation, Seoul (KR)

(72) Inventors: Jeawan Kim, Hwaseong-si (KR); Hochan An, Hwaseong-si (KR); Wan Je Cho, Hwaseong-si (KR); Hoyoung Jeong, Daegu (KR); Man Hee Park, Suwon-si (KR); Yeong Jun Kim, Incheon (KR); Jae Yeon Kim, Hwaseong-si (KR); Yeonho Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 15 days.

(21) Appl. No.: 18/166,634

(22) Filed: Feb. 9, 2023

(65) Prior Publication Data

US 2024/0100911 A1    Mar. 28, 2024

(30) Foreign Application Priority Data

Sep. 22, 2022  (KR) .......................... 10-2022-0120149

(51) Int. Cl.
*B60H 1/32* (2006.01)
(52) U.S. Cl.
CPC ......... *B60H 1/3228* (2019.05); *B60H 1/3205* (2013.01)

(58) Field of Classification Search
CPC ..... B60H 1/3228; B60H 1/3205; F25B 30/02; F25B 41/30; F25B 41/31; F25B 41/325; F25B 41/368; F25B 41/39; F25B 41/42; F25B 2400/051; F25B 2400/054
See application file for complete search history.

(56) References Cited

U.S. PATENT DOCUMENTS

| 10,661,631 | B2 | 5/2020 | Kawano | |
|---|---|---|---|---|
| 11,254,190 | B2 | 2/2022 | He et al. | |
| 2012/0011866 | A1* | 1/2012 | Scarcella | F25B 41/39 62/79 |
| 2022/0011029 | A1* | 1/2022 | Cho | F25B 43/00 |

(Continued)

FOREIGN PATENT DOCUMENTS

KR    20220009707 A    1/2022

*Primary Examiner* — Marc E Norman
(74) *Attorney, Agent, or Firm* — Slater Matsil, LLP

(57) ABSTRACT

A heat pump system includes a cooling apparatus in which a coolant is circulated, a compressor to compress a refrigerant, a condenser connected to the compressor through a refrigerant line and configured to condense the refrigerant by heat-exchanging with the refrigerant and the coolant, an evaporator connected to the condenser through the refrigerant line and configured to evaporate the refrigerant by heat-exchanging with the refrigerant and the coolant, a gas injection device provided in the refrigerant line between the condenser and the evaporator and configured to selectively expand and flow the refrigerant and selectively supply some of the refrigerant to the compressor, a refrigerant connection line including a first end connected to the refrigerant line and a second end connected to the gas injection device between the compressor and the evaporator, and a chiller in the refrigerant connection line for adjusting a temperature of the coolant by heat-exchange.

19 Claims, 8 Drawing Sheets

(56) References Cited

U.S. PATENT DOCUMENTS

| | | |
|---|---|---|
| 2022/0088990 A1* | 3/2022 | Kim ................... B60H 1/3223 |
| 2022/0088991 A1* | 3/2022 | Kim ....................... B60H 1/03 |
| 2023/0415539 A1* | 12/2023 | Kim ................ B60H 1/00278 |
| 2024/0010046 A1* | 1/2024 | Kim ................... B60H 1/3223 |
| 2024/0011689 A1* | 1/2024 | Maruko .................. F25B 1/00 |

\* cited by examiner

HEAT PUMP SYSTEM FOR VEHICLE

CROSS-REFERENCE TO RELATED APPLICATIONS

This application claims the benefit of Korean Patent Application No. 10-2022-0120149, filed on Sep. 22, 2022, which application is hereby incorporated herein by reference.

TECHNICAL FIELD

The present invention relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally-friendly vehicle capable of substantially substituting for an internal combustion engine vehicle is required, and the environmentally-friendly vehicle is classified into an electric vehicle driven using a fuel cell or electricity as a power source and a hybrid vehicle driven using an engine and a battery.

In the electric vehicle or the hybrid vehicle among these environmentally-friendly vehicles, a separate heater is not used unlike an air conditioner of a general vehicle, and an air conditioner used in the environmentally-friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since the battery cooling system warming or cooling the battery according to a state of the vehicle is separately provided so that the battery exhibits optimal performance, a plurality of valves for connecting the respective connection pipes to each other are used, and noise and vibration due to frequent opening or closing operations of these valves are transferred to the interior of the vehicle, such that ride comfort is deteriorated.

In addition, when heating the interior of the vehicle, there are disadvantages of decreasing heating performance due to a lack of a heat source, increasing electricity consumption due to the use of an electric heater, increasing power consumption of the compressor, and the like.

The above information disclosed in this background section is only for enhancement of understanding of the background of embodiments of the invention, and therefore it may contain information that does not form the prior art that is already known to a person of ordinary skill in the art.

SUMMARY

The present invention relates to a heat pump system for a vehicle. Particular embodiments relate to a heat pump system for a vehicle for improving cooling and heating performance by applying a gas injection device that selectively operates in an air conditioning mode of a selected vehicle interior.

Embodiments of the present invention provide a heat pump system for a vehicle capable of improving cooling and heating performance by increasing a flow rate of the refrigerant by applying a gas injection device that selectively operates in an air conditioning mode of a selected vehicle interior.

A heat pump system for a vehicle according to an embodiment of the present invention includes a cooling apparatus including a radiator, an electrical component, and a battery module in which a coolant is circulated, a compressor compressing a refrigerant, a condenser connected to the compressor through a refrigerant line and condensing the refrigerant by heat-exchanging with the refrigerant supplied from the compressor and the coolant supplied from the cooling apparatus, a gas injection device provided in the refrigerant line between the condenser and the evaporator and for selectively expanding and flowing the refrigerant supplied from the condenser and selectively supplying some of the supplied refrigerant to the compressor to increase the flow rate of the refrigerant circulating in the refrigerant line, a refrigerant connection line including one end connected to the refrigerant line and the other end connected to the gas injection device between the compressor and the evaporator, and a chiller provided in the refrigerant connection line and adjusting a temperature of the coolant by heat-exchanging the refrigerant introduced into the refrigerant connection line with the selectively introduced coolant.

The gas injection device may include a gas-liquid separator separating and selectively discharging gaseous refrigerant and liquid refrigerant from among the refrigerants introduced into an inside, a supply part connected to the condenser through the refrigerant line such that the refrigerant supplied from the condenser inflows, a first expansion valve provided between the gas-liquid separator and the supply part to selectively expand the refrigerant supplied to the supply part to be supplied to the gas-liquid separator, a second expansion valve provided between the gas-liquid separator and the supply part to selectively expand the refrigerant supplied to the supply part to be supplied to the chiller or to supply the refrigerant supplied from the gas-liquid separator to the chiller, a third expansion valve provided between the gas-liquid separator and the supply part to selectively expand the refrigerant supplied to the supply part to be supplied to the evaporator or to supply the refrigerant supplied from the gas-liquid separator to the evaporator, a discharge part connecting the gas-liquid separator to the second expansion valve and the third expansion valve so as to discharge the refrigerant from the gas-liquid separator to the second expansion valve or the third expansion valve, and a supply line connecting the gas-liquid separator and the compressor and selectively supplying the refrigerant in a gaseous state from the gas-liquid separator to the compressor.

The second expansion valve and the third expansion valve may be arranged in parallel with the first expansion valve through the supply part and the discharge part.

The heat pump system for a vehicle may further include an accumulator provided in the refrigerant line between the evaporator and the compressor, an internal heat exchanger connected to the refrigerant line connecting the condenser and the gas injection device, and the refrigerant line connecting the evaporator and the compressor, respectively, and provided inside the accumulator.

The internal heat exchanger may heat-exchange the refrigerant condensed in the condenser and a low-temperature refrigerant discharged from the evaporator, and may supply each heat-exchanged refrigerant to the gas injection device and the compressor, respectively.

The first, second, and third expansion valves may selectively operate in the air conditioning mode of the vehicle including the cooling mode, the heating mode, and the dehumidifying mode and may selectively expand the refrigerant while controlling the flow of the refrigerant.

The gas-liquid separator may be operated when the first expansion valve expands the refrigerant in the air conditioning mode of the vehicle and may increase the flow rate of the refrigerant circulating through the refrigerant line by supplying gaseous refrigerant among the supplied refrigerant to the compressor through the supply line.

When the gas injection device is operated in the cooling mode of the vehicle, the first expansion valve may expand the refrigerant supplied through the supply part to the gas injection device, the second expansion valve may not be operated, the third expansion valve may expand the refrigerant supplied from the gas-liquid separator through the discharge part to flow into the refrigerant line, the supply line may be opened, and the gas-liquid separator may supply a gaseous refrigerant among the introduced refrigerant to the compressor through the opened supply line.

When the gas injection device is not operated in the cooling mode of the vehicle, the first and second expansion valves may not be operated, the inflow of the refrigerant into the gas-liquid separator may be blocked, the third expansion valve may expand the refrigerant supplied through the supply part and may supply it to the evaporator through the refrigerant line, and the supply line may be closed.

When the gas injection device is operated in the cooling mode of the vehicle and cools the battery module, the first expansion valve may expand the refrigerant supplied through the supply part to the gas injection device, the second expansion valve may expand the refrigerant supplied from the gas-liquid separator through the discharge part to flow into the refrigerant connection line connected to the chiller, the third expansion valve may expand the refrigerant supplied from the gas-liquid separator through the discharge part to flow into the refrigerant line, the supply line may be opened, and the gas-liquid separator may supply a gaseous refrigerant among the introduced refrigerant to the compressor through the opened supply line.

When the gas injection device is operated in the heating mode of the vehicle and recovers a waste heat of the electrical component, the first expansion valve may expand the refrigerant supplied through the supply part to the gas injection device, the second expansion valve may expand the refrigerant supplied from the gas-liquid separator through the discharge part to flow into the refrigerant connection line connected to the chiller, the third expansion valve may not be operated, the supply line may be opened, and the gas-liquid separator may supply a gaseous refrigerant among the introduced refrigerant to the compressor through the opened supply line.

When the gas injection device is not operated in the heating mode of the vehicle, the first expansion valve may not be operated, the second expansion valve may expand the refrigerant supplied through the supply part to flow into the refrigerant connection line connected to the chiller, the third expansion valve may not be operated, the inflow of the refrigerant into the gas-liquid separator may be blocked, and the supply line may be closed.

When the gas injection device is not operated in the heating mode of the vehicle and recovers an external heat source and a waste heat of the electrical component and a waste heat of the battery module in a heating mode of vehicle, the first expansion valve may not be operated, the inflow of the refrigerant into the gas-liquid separator may be blocked, the second expansion valve may expand the refrigerant supplied through the supply part to flow into the refrigerant connection line connected to the chiller, the third expansion valve may expand the refrigerant supplied through the supply part and may supply it to the evaporator through the refrigerant line, and the supply line may be closed.

The first expansion valve may selectively expand the refrigerant while controlling the flow of the refrigerant and may be a 2-way electronic expansion valve with one inlet and one outlet.

The second expansion valve and the third expansion valve may selectively expand the refrigerant while controlling the flow of the refrigerant and may be a 3-way electronic expansion valve with two inlets and one outlet.

The condenser may be connected to the radiator through a first line through which the coolant circulates and connected to the heater core through a second line through which the coolant circulates, the evaporator may be connected to the radiator through a third line through which the coolant circulates and connected to a cabin cooler through a fourth line through which the coolant circulates, and the chiller may be connected to the electrical component through a fifth line through which the coolant circulates and connected to the battery module through a sixth line through which the coolant circulates.

The first line may always be opened so as to supply coolant to the condenser in the cooling mode, heating mode, and dehumidifying mode of the vehicle, and the second line may be opened so as to connect the condenser and the heater core in the heating mode of the vehicle.

The third line may be opened so as to connect the radiator and the evaporator when the external heat source is recovered in the heating mode of the vehicle, and the fourth line may be opened so as to connect the evaporator and the cabin cooler in the cooling mode of the vehicle.

The fifth line may be opened so as to connect the chiller and the electrical component when a waste heat of the electrical component is recovered in the heating mode of the vehicle, and the sixth line may be opened so as to connect the chiller and the battery module when the battery module is cooled in the cooling mode of the vehicle or when a waste heat of the battery module is recovered in the heating mode of the vehicle.

As described above, the heat pump system for the vehicle according to embodiments of the present invention is capable of improving cooling and heating performance by increasing a flow rate of the refrigerant by applying a gas injection device that selectively operates in an air conditioning mode of a selected vehicle interior.

In addition, embodiments of the present invention may simplify the system by minimizing components and maximizing system performance by using a gas injection device.

Furthermore, according to embodiments of the present invention, it is possible to reduce manufacturing cost and weight through simplification of an entire system and to improve space utilization.

Figure 1:
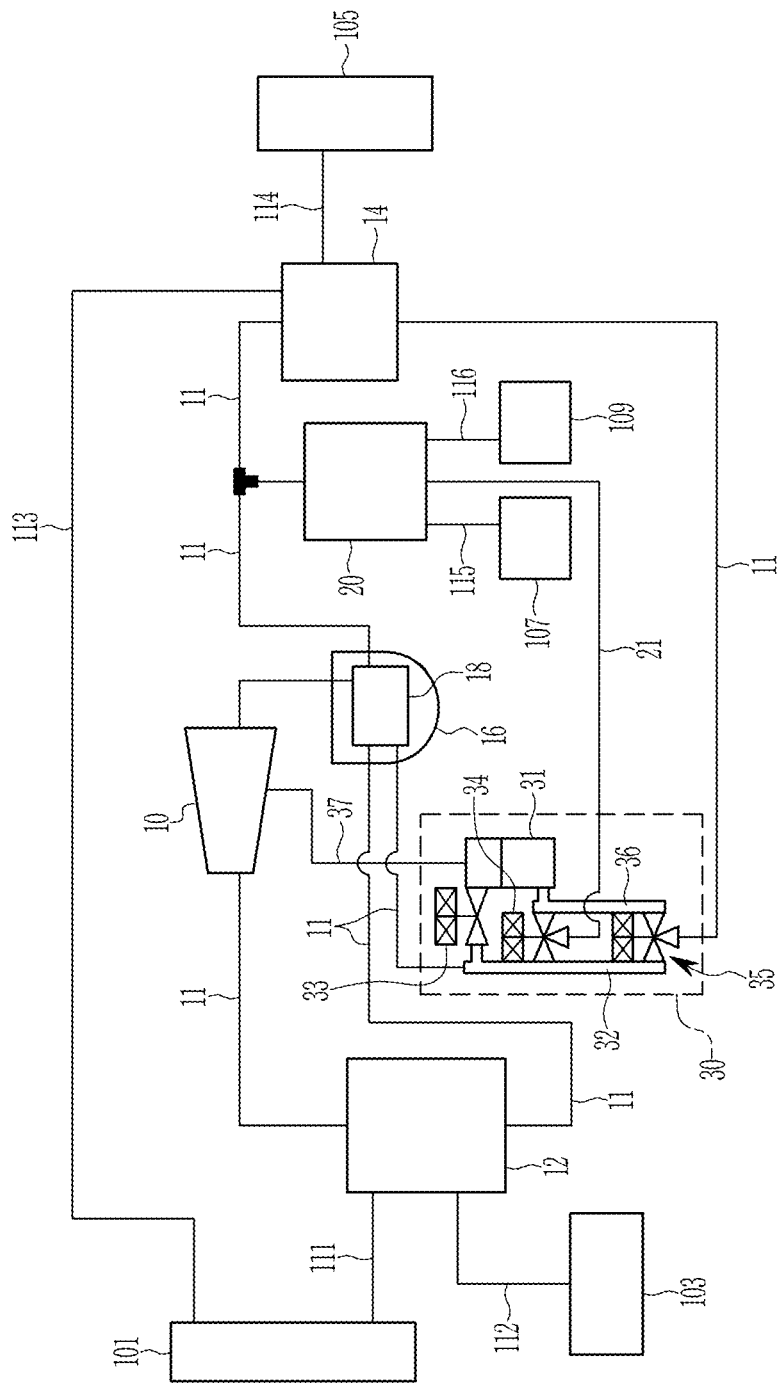
FIG. 1 illustrates a block diagram of a heat pump system for a vehicle according to an embodiment of the present invention.

The following reference identifiers may be used in connection with the accompanying drawings to describe exemplary embodiments of the present disclosure.

10: compressor
    11: refrigerant line
    12: condenser
    14: evaporator
    16: accumulator
    18: internal heat exchanger
    20: chiller
    30: gas injection device
    31: gas-liquid separator
    32: supply part
    33, 34, 35: first, second, and third expansion valves
    36: discharge part
    37: supply line
    101: radiator
    103: heater core
    105: cabin cooler
    107: electrical component
    109: battery module
    111, 112, 113, 114, 115, 116: first, second, third, fourth, fifth and sixth lines

DETAILED DESCRIPTION OF ILLUSTRATIVE EMBODIMENTS

Exemplary embodiments of the present invention will hereinafter be described in detail with reference to the accompanying drawings.

Since the embodiments described in the specification and the configurations shown in the drawings are merely the most preferable embodiments and configurations of the present invention, they do not represent all of the technical ideas of the present invention, and it should be understood that that various equivalents and modified examples, which may replace the embodiments, are possible.

In order to clearly describe embodiments of the present invention, parts that are irrelevant to the description are omitted, and identical or similar constituent elements throughout the specification are denoted by the same reference numerals.

Since the size and thickness of each configuration shown in the drawings are arbitrarily shown for convenience of description, embodiments of the present invention are not necessarily limited to configurations illustrated in the drawings, and in order to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means," " . . . part," and " . . . member" described in the specification mean a unit of a comprehensive configuration having at least one function or operation.

FIG. 1 illustrates a block diagram of a heat pump system for a vehicle according to an embodiment of the present invention.

A heat pump system for a vehicle according to an embodiment of the present invention may improve cooling and heating performance by applying a gas injection device 30 that selectively operates in an air conditioning mode of a vehicle interior selected from a cooling mode or a heating mode.

Here, in the heat pump system of an electric vehicle, a cooling apparatus in which a coolant circulates and an air conditioner that is an air conditioner for cooling and heating an interior may be mutually interconnected.

That is, referring to FIG. 1, the heat pump system may include the cooling apparatus, and the air conditioner provided in a compressor 10, a condenser 12, an evaporator 14, a chiller 20, a refrigerant connection line 21, and the gas injection device 30.

First, the cooling apparatus may include a radiator 101, an electrical component 107, and a battery module 109. The radiator 101, the electrical component 107, and the battery module 109 are connected by a coolant line through which coolant circulates.

The radiator 101 is disposed at the front of the vehicle. A cooling fan (not shown) is provided behind the radiator 101.

Accordingly, the radiator 101 may cool the coolant through heat-exchange between the operation of the cooling fan and the outside air.

Herein, the radiator 101 may be connected to the condenser 12 through a first line in through which the coolant circulates and may be connected to the evaporator 14 through a third line 113 through which the coolant circulates.

In addition, the condenser 12 may be connected to a heater core 103 through a second line 112 through which the coolant circulates. Accordingly, the coolant whose temperature is increased through heat-exchange with a refrigerant in the condenser 12 may be supplied to the heater core 103 through the second line 112 in the heating mode of the vehicle.

The high temperature coolant supplied to the heater core 103 may increase the temperature of the external air passing through the heater core 103. That is, the inflowed external air is converted to a high temperature state while passing through the heater core 103 to flow into the vehicle interior, so that the vehicle interior may be heated.

Herein, the first line in may always be open to supply coolant to the condenser 12 in the cooling mode, heating mode, and dehumidifying mode of the vehicle.

The second line 112 may be opened to connect the condenser 12 and the heater core 103 in the heating mode of the vehicle.

In addition, the third line 113 may be opened to connect the radiator 101 and the evaporator 14 when the external heat source is recovered in the heating mode of the vehicle.

The evaporator 14 may be connected to the cabin cooler 105 through the fourth line 114 through which through which the coolant circulates. Accordingly, the coolant whose temperature is lowered through heat-exchange with the refrigerant in the evaporator 14 may be supplied to the cabin cooler 105 through the fourth line 114 in the cooling mode of the vehicle.

Then, the external air passing through the cabin cooler 105 is cooled while passing through the cabin cooler 105 by the low-temperature coolant supplied to the cabin cooler 105. The cooled external air flows into the interior of the vehicle, thereby cooling the vehicle interior.

That is, the fourth line 114 may be opened to connect the evaporator 14 and the cabin cooler 105 in the cooling mode of the vehicle.

Meanwhile, the electrical component 107 is connected to the chiller 20 through a fifth line 115 through which the coolant circulated, and the battery module 109 is connected to the chiller 20 through a sixth line 116 through which the coolant circulated.

Herein, the fifth line 115 is opened to connect the chiller 20 and the electrical component 107 when waste heat of the electrical component 107 is recovered in the heating mode of the vehicle.

The sixth line 116 may be opened to connect the chiller 20 and the battery module 109 when the battery module 109 is cooled in the cooling mode of the vehicle or when the waste heat of the battery module 109 is recovered in the heating mode of the vehicle.

Herein, the coolant may be selectively circulated in the first, second, third, fourth, fifth, and sixth lines 111, 112, 113, 114, 115, and 116 by the operation of a water pump (not shown).

Meanwhile, the electrical component 107 may include an electric power control unit (EPCU), a motor, an inverter, a charger (On Board Charger, OBC), or an autonomous driving controller.

The power control apparatus, the inverter, the motor, or the autonomous driving controller may heat up while driving, and the charger may heat up when charging the battery module 109.

That is, when the waste heat of the electrical component 107 is recovered in the heating mode of the vehicle, heat generated from the power control apparatus, the motor, the inverter, the charger, or the autonomous driving controller may be recovered.

In the present exemplary embodiment, the compressor 10 may compress a supplied refrigerant. The condenser 12 may be connected to the compressor 10 through a refrigerant line 11.

The condenser 12 may condense the refrigerant by heat-exchanging with the refrigerant supplied from the compressor 10 and the coolant supplied from the radiator 101 through the first line in.

The evaporator 14 is connected to the condenser 12 through the refrigerant line 11. The evaporator 14 may evaporate the refrigerant by heat-exchanging the refrigerant supplied from the condenser 12 through the gas injection device 30 with the coolant supplied from the cabin cooler 105.

In addition, when recovering the external heat source in the heating mode of the vehicle, the evaporator 14 may recover the external heat source and evaporate the refrigerant while heat-exchanging the coolant supplied from the radiator 101 through the third line 113 with the refrigerant.

Meanwhile, the heat pump system may further include an accumulator 16 and an internal heat exchanger 18.

The accumulator 16 may be provided in the refrigerant line 11 between the evaporator 14 and the compressor 10.

The accumulator 16 improves the efficiency and durability of the compressor 10 by supplying only gaseous refrigerant to the compressor 10.

The internal heat exchanger 18 may be connected to the refrigerant line 11 connecting the condenser 12 and the gas injection device 30, and the refrigerant line n connecting the evaporator 14 and the compressor 10, respectively.

The internal heat exchanger 18 may be provided inside the accumulator 16.

Herein, the internal heat exchanger 18 heat-exchanges the refrigerant condensed in the condenser 12 and the low-temperature refrigerant discharged from the evaporator 14 and may supply each heat-exchanged refrigerant to the gas injection device 30 and the compressor 10, respectively.

In the present exemplary embodiment, a first end of the refrigerant connection line 21 may be connected to the refrigerant line 11 between the compressor 10 and the evaporator 14. A second end of the refrigerant connection line 21 is connected to the gas injection device 30.

The chiller 20 is provided in the refrigerant connection line 21. The coolant may be selectively circulated inside the chiller 20 through any one or both of the fifth line 115 and the sixth line 116.

That is, the chiller 20 may be a water-cooled heat-exchanger into which the coolant is flowed.

Accordingly, the chiller 20 can heat-exchange the refrigerant flowed into the refrigerant connection line 21 with the coolant selectively inflowed through any one or both of the fifth line 115 and the sixth line 116 to control the temperature of the coolant.

The gas injection device 30 may be provided in the refrigerant line 11 between the condenser 12 and the evaporator 14.

This gas injection device 30 may selectively expand and flow the refrigerant supplied from the condenser 12 and may selectively supply, among the supplied refrigerants, some of the refrigerant to the compressor 10 to increase the flow rate of the refrigerant circulating in the refrigerant line 11.

The gas injection device 30 configured in this way may be selectively operated in the cooling mode, heating mode or dehumidifying mode of the vehicle.

Herein, the gas injection device 30 includes a gas-liquid separator 31, a supply part 32, a first expansion valve 33, a second expansion valve 34, a third expansion valve 35, and a supply line 37.

First, the gas-liquid separator 31 may separate gaseous refrigerant and liquid refrigerant of the refrigerant flowed inside to selectively discharge them.

The supply part 32 may be connected to the condenser 12 through the refrigerant line 11 such that the refrigerant supplied from the condenser 12 inflows.

In the present embodiment, the first expansion valve 33 may be provided between the gas-liquid separator 31 and the supply part 32 to selectively expand the refrigerant supplied to the supply part 32 to be supplied to the gas-liquid separator 31.

The second expansion valve 34 may be provided between the gas-liquid separator 31 and the supply part 32 to selectively expand the refrigerant supplied to the supply pall 32 to be supplied to the chiller 20 or to supply the refrigerant supplied from the gas-liquid separator 31 to the chiller 20.

The third expansion valve 35 may be provided between the gas-liquid separator 31 and the supply part 32 to selectively expand the refrigerant supplied to the supply pall 32 to be supplied to the evaporator 14 or to supply the refrigerant supplied from the gas-liquid separator 31 to the evaporator 14.

Here, the first, second, and third expansion valves 33, 34, and 35 may selectively operate in the air conditioning mode of the vehicle including the cooling mode, the heating mode, and the dehumidifying mode and may selectively expand the refrigerant while controlling the flow of the refrigerant.

That is, the first expansion valve 33 may selectively expand the refrigerant while controlling the flow of the refrigerant and may be a 2-way electronic expansion valve having one inlet and one outlet.

In addition, the second expansion valve 34 and the third expansion valve 35 may selectively expand the refrigerant while controlling the flow of the refrigerant and may be a 3-way electronic expansion valve having two inlets and one outlet.

In the present exemplary embodiment, the discharge part 36 may connect the gas-liquid separator 31 to the second expansion valve 34 and the third expansion valve 35 so as to discharge the refrigerant from the gas-liquid separator 31 to the second expansion valve 34 or the third expansion valve 35.

Herein, the second expansion valve 34 and the third expansion valve 35 may be arranged in parallel with the first expansion valve 33 through the supply part 32 and the discharge part 36.

Also, the supply line 37 connects the gas-liquid separator 31 and the compressor 10. This supply line 37 may selectively supply the refrigerant in the gaseous state from the gas-liquid separator 31 to the compressor 10 when the refrigerant is supplied to the gas-liquid separator 31.

That is, the supply line 37 may connect the gas-liquid separator 31 and the compressor 10 so that the gaseous refrigerant separated by the gas-liquid separator 31 is selectively inflowed to the compressor 10.

In the gas injection device 30 configured as described above, the gas-liquid separator 31 may be operated when the first expansion valve 33 expands the refrigerant in the air conditioning mode of the vehicle.

That is, when the first expansion valve 33 expands the refrigerant and supplies it to the gas-liquid separator 31, the gas-liquid separator 31 may increase the flow rate of the refrigerant circulating through the refrigerant line 11 by supplying the gaseous refrigerant to the compressor 10 through the supply line 37 among the supplied refrigerant.

Hereinafter, an operation and action of the heat pump system for the vehicle according to the embodiment of the present invention configured as described above will be described in detail with reference to FIG. 2 to FIG. 8.

First, the operation for the case for operating the gas-liquid separator 31 in the cooling mode of the vehicle in the heat pump system for the vehicle according to an embodiment of the present invention is described with reference to FIG. 2.

Figure 2:
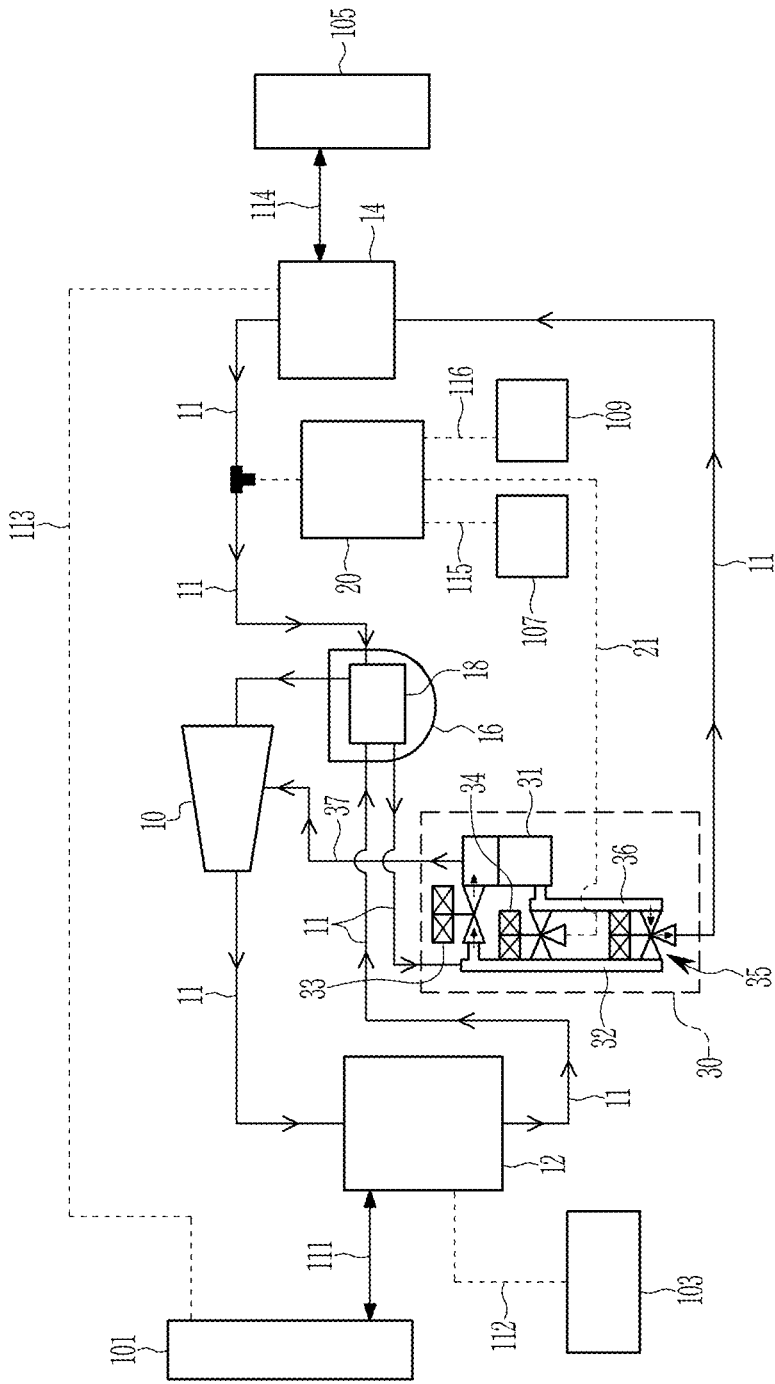
FIG. 2 illustrates an operational state diagram for a case in which a gas-liquid separator is operated in a cooling mode of a vehicle in a heat pump system for the vehicle according to an embodiment of the present invention.

FIG. 2 illustrates an operational state diagram for a case in which a gas-liquid separator is operated in a cooling mode of a vehicle in a heat pump system for the vehicle according to an embodiment of the present invention.

Referring to FIG. 2, when the gas injection device 30 is operated in the cooling mode of the vehicle, the first expansion valve 33 expands the refrigerant supplied through the supply part 32 to the gas-liquid separator 31.

Herein, the supply line 37 is opened. The gas-liquid separator 31 may supply the gaseous refrigerant among the refrigerant introduced into the compressor 10 through the opened supply line 37.

That is, the gas injection device 30 flows the gaseous refrigerant heat-exchanged while passing through the gas-liquid separator 31 back into the compressor 19 through the supply line 37, thereby increasing the flow rate of the refrigerant circulating in the refrigerant line 11.

At the same time, the second expansion valve 34 may not be operated. In addition, the third expansion valve 35 may expand the refrigerant supplied from the gas-liquid separator 31 through the discharge part 36 to flow into the refrigerant line 11.

The liquid refrigerant stored in the gas-liquid separator 31 may flow into the evaporator 14 along the refrigerant line 11 in an expanded state through the operation of the third expansion valve 35.

The refrigerant introduced into the evaporator 14 may be evaporated through heat-exchange with the coolant supplied from the cabin cooler 105 through the fourth line 114.

Herein, the external air flowing into an interior of the vehicle is cooled through heat-exchange with the low-temperature coolant introducing into the cabin cooler 105. Accordingly, the cooled external air directly introduces into the interior of the vehicle, thereby cooling the interior of the vehicle.

Meanwhile, the refrigerant passing through the evaporator 14 may be introduced into the accumulator 16 and may be introduced into the compressor 10 after passing through the internal heat exchanger 18.

That is, the refrigerant passing through the accumulator 16 and the internal heat exchanger 18 and the refrigerant supplied from the gas-liquid separator 31 through the supply line 37 may be introduced into the compressor 10. The introduced refrigerant may be compressed by the operation of the compressor 10.

The refrigerant compressed in the compressor 10 is supplied to the condenser 12. At this time, the condenser 12 may condense the refrigerant by using the coolant supplied from the radiator 101 through the opened first line in.

The refrigerant condensed in the condenser 12 may pass through the internal heat exchanger 18 and be supplied to the gas injection device 30.

The heat pump system according to an embodiment of the present invention may increase the flow rate of the refrigerant flowing along the refrigerant line 11 while repeatedly performing the above-described operation.

In addition, the heat pump system increases the flow rate of the refrigerant flowing along the refrigerant line 11, thereby improving overall cooling performance and efficiency and efficiently cooling the interior of the vehicle.

The operation for the case for operating the gas-liquid separator 31 and cooling the battery module 109 in the cooling mode of the vehicle in the heat pump system for the vehicle according to an embodiment of the present invention is described with reference to FIG. 3.

Figure 3:
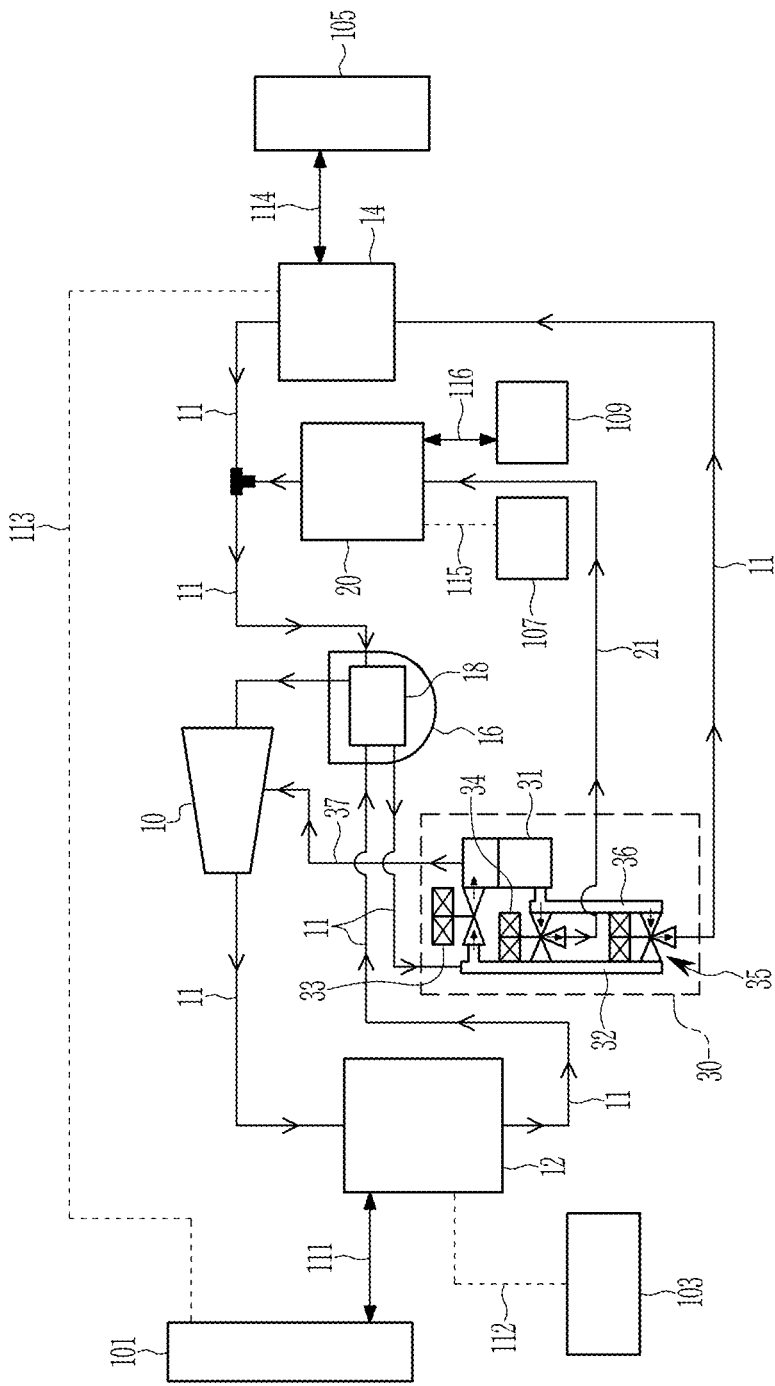
FIG. 3 illustrates an operational state diagram for a case in which a gas-liquid separator is operated and a battery module is cooled in a cooling mode of a vehicle in a heat pump system for the vehicle according to an embodiment of the present invention.

FIG. 3 illustrates an operational state diagram for a case in which a gas-liquid separator is operated and a battery module is cooled in a cooling mode of a vehicle in a heat pump system for the vehicle according to an embodiment of the present invention.

Referring to FIG. 3, when the gas injection device 30 is operated in the cooling mode of the vehicle, the first expansion valve 33 expands the refrigerant supplied through the supply part 32 to the gas-liquid separator 31.

Herein, the supply line 37 is opened. The gas-liquid separator 31 may supply the gaseous refrigerant among the refrigerant introduced into the compressor 10 through the opened supply line 37.

That is, the gas injection device 30 flows the gaseous refrigerant heat-exchanged while passing through the gas-liquid separator 31 back into the compressor 19 through the supply line 37, thereby increasing the flow rate of the refrigerant circulating in the refrigerant line 11.

At the same time, the second expansion valve 34 may expand the refrigerant supplied from the gas-liquid separator 31 through the discharge part 36 to flow into the refrigerant connection line 21 connected to the chiller 20.

The refrigerant introduced into the refrigerant connection line 21 may be introduced into the chiller 20. The refrigerant introduced into the chiller 20 may cool the coolant while heat-exchanging with the coolant supplied from the battery module 109 through the sixth line 116.

The coolant cooled in the chiller 20 is supplied to the battery module 109 along the sixth line 116. Accordingly, the battery module 106 may be efficiently cooled by the coolant cooled in the chiller 20.

That is, the coolant circulated through the sixth line 116 may efficiently cool the battery module 109 while repeatedly performing the operation as described above.

In addition, the third expansion valve 35 may expand the refrigerant supplied from the gas-liquid separator 31 through the discharge part 36 to flow into the refrigerant line 11.

The liquid refrigerant stored in the gas-liquid separator 31 may flow into the chiller 20 along the refrigerant connection line 21 in an expanded state through the operation of the second expansion valve 34.

In addition, the liquid refrigerant stored in the gas-liquid separator 31 may flow into the evaporator 14 along the refrigerant line 11 in an expanded state through the operation of the third expansion valve 35.

The refrigerant introduced into the evaporator 14 may be evaporated through heat-exchange with the coolant supplied from the cabin cooler 105 through the fourth line 114.

Herein, the external air flowing into an interior of the vehicle is cooled through heat-exchange with the low-temperature coolant introducing into the cabin cooler 105. Accordingly, the cooled external air directly introduces into the interior of the vehicle, thereby cooling the interior of the vehicle.

Meanwhile, the refrigerant passing through the evaporator 14 and the chiller 20 may be introduced into the accumulator 16 and may be introduced into the compressor 10 after passing through the internal heat exchanger 18.

That is, the refrigerant passing through the accumulator 16 and the internal heat exchanger 18 and the refrigerant supplied from the gas-liquid separator 31 through the supply line 37 may be introduced into the compressor 10. The introduced refrigerant may be compressed by the operation of the compressor 10.

The refrigerant compressed in the compressor 10 is supplied to the condenser 12. At this time, the condenser 12 may condense the refrigerant by using the coolant supplied from the radiator 101 through the opened first line in.

The refrigerant condensed in the condenser 12 may pass through the internal heat exchanger 18 and be supplied to the gas injection device 30.

The heat pump system according to an embodiment of the present invention may increase the flow rate of the refrigerant flowing along the refrigerant line 11 while repeatedly performing the above-described operation.

In addition, the heat pump system increases the flow rate of the refrigerant flowing along the refrigerant line 11, thereby improving overall cooling performance and efficiency and efficiently cooling the interior of the vehicle.

At the same time, the heat pump system may efficiently cool the battery module 109 by using the low-temperature cooling water cooled in the chiller 20.

The operation for the case for operating the gas-liquid separator 31 and recovering the waste heat of the electrical component 107 in the heating mode of the vehicle in the heat pump system for the vehicle according to an embodiment of the present invention is described with reference to FIG. 4.

Figure 4:
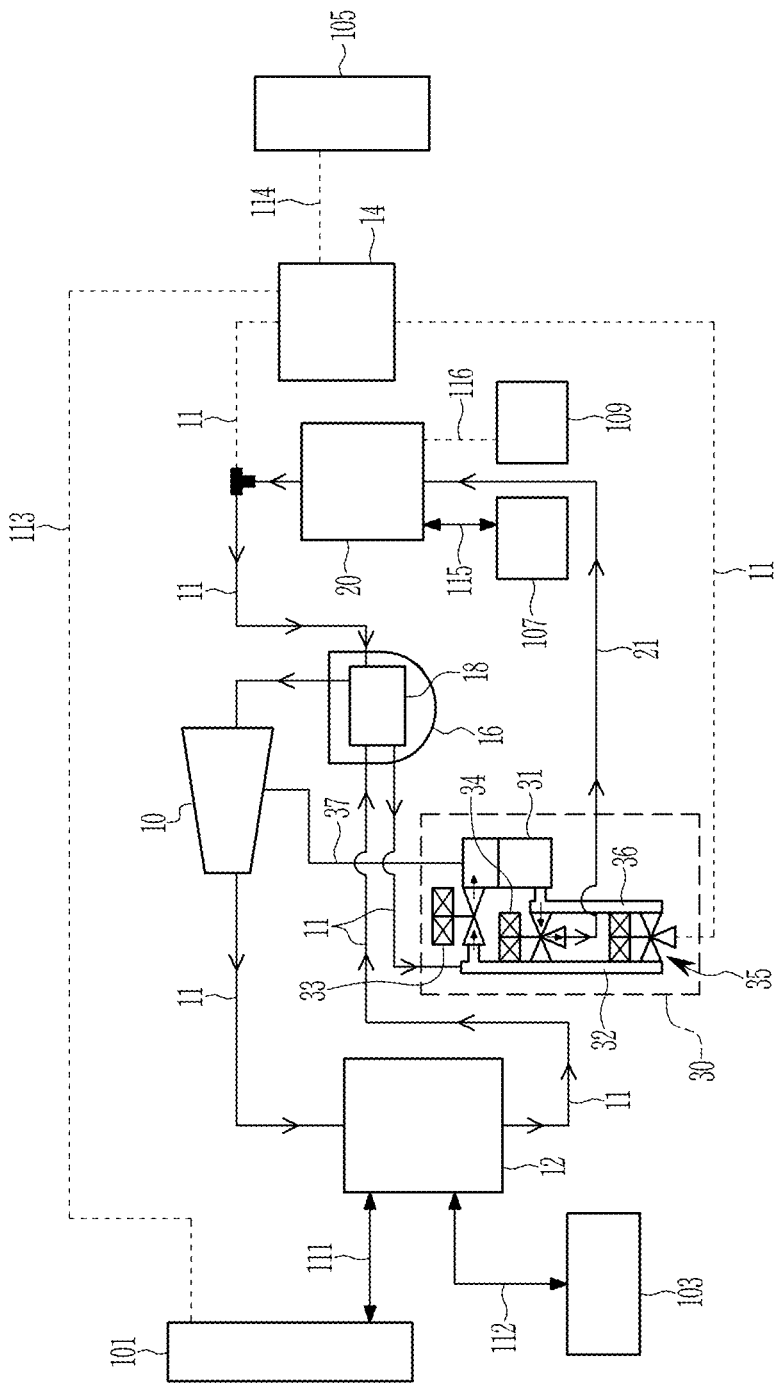
FIG. 4 illustrates an operational state diagram for a case in which a gas-liquid separator is operated and a waste heat is recovered from electrical components in a heating mode of a vehicle in a heat pump system for the vehicle according to an embodiment of the present invention.

FIG. 4 illustrates an operational state diagram for a case in which a gas-liquid separator is operated and a waste heat is recovered from electrical components in a heating mode of a vehicle in a heat pump system for the vehicle according to an embodiment of the present invention.

Referring to FIG. 4, when the gas injection device 30 is operated in the heating mode of the vehicle, the first expansion valve 33 expands the refrigerant supplied through the supply part 32 to the gas injection device 30.

Herein, the supply line 37 is opened.

Accordingly, the gas-liquid separator 31 may supply the gaseous refrigerant among the introduced refrigerant to the compressor 10 through the opened supply line 37.

That is, the gas injection device 30 flows the gaseous refrigerant heat-exchanged while passing through the gas-liquid separator 31 back into the compressor 19 through the supply line 37, thereby increasing the flow rate of the refrigerant circulating in the refrigerant line 11.

At the same time, the second expansion valve 34 may expand the refrigerant supplied from the gas-liquid separator 31 through the discharge part 36 to flow into the refrigerant connection line 21 connected to the chiller 20.

The refrigerant introduced into the refrigerant connection line 21 may be introduced into the chiller 20. The refrigerant introduced into the chiller 20 may cool the coolant while heat-exchanging with the coolant supplied from the electrical component 107 through the fifth line 115.

At this time, the temperature of the coolant may increase by recovering waste heat from the electrical component 107 while cooling the electrical component 107. The coolant whose temperature has risen through this operation may be supplied to the chiller 20.

Herein, the chiller 20 may recover the waste heat of the electrical component 107 while heat-exchanging the coolant supplied from the electrical component 107 through the fifth line 115 with the refrigerant.

The third expansion valve 35 may not be operated.

The liquid refrigerant stored in the gas-liquid separator 31 may flow into the chiller 20 along the refrigerant connection line 21 in an expanded state through the operation of the second expansion valve 34.

Meanwhile, the refrigerant passing through the chiller 20 may be introduced into the accumulator 16 and may be introduced into the compressor 10 after passing through the internal heat exchanger 18.

That is, the refrigerant passing through the accumulator 16 and the internal heat exchanger 18 and the refrigerant supplied from the gas-liquid separator 31 through the supply line 37 may be introduced into the compressor 10. The introduced refrigerant may be compressed by the operation of the compressor 10.

The refrigerant compressed in the compressor 10 is supplied to the condenser 12. At this time, the condenser 12 may condense the refrigerant by using the coolant supplied from the radiator 101 through the opened first line in.

In addition, the refrigerant introduced into the condenser 12 may be condensed while heat-exchanging with the coolant supplied from the heater core 103 through the second line 112.

Accordingly, the coolant whose temperature is increased through heat-exchange with the refrigerant in the condenser 12 may be supplied to the heater core 103.

The refrigerant condensed in the condenser 12 may pass through the internal heat exchanger 18 and be supplied to the gas injection device 30.

Herein, the external air introduced into the vehicle is converted into a high-temperature state through heat exchange with the high-temperature coolant introduced into the heater core 103 and introduced into the vehicle interior, thereby realizing the heating of the vehicle interior.

Accordingly, the refrigerant circulated in the heat pump system may smoothly recover the waste heat from the coolant whose temperature has risen while passing through the electrical component 107 from the chiller 20, thereby improving heating performance and efficiency.

In addition, embodiments of the present invention may improve heating efficiency and performance while minimizing a use amount of a separate electric heater.

Furthermore, the gas injection device 30 may maximize the heating performance by increasing the flow rate of the refrigerant circulating in the refrigerant line 11.

The operation for the case for operating the gas-liquid separator 31 and recovering the external heat source, the waste heat of the electrical component 107, and the waste heat of the battery module 109 in the heating mode of the vehicle in the heat pump system for the vehicle according to an embodiment of the present invention is described with reference to FIG. 5.

Figure 5:
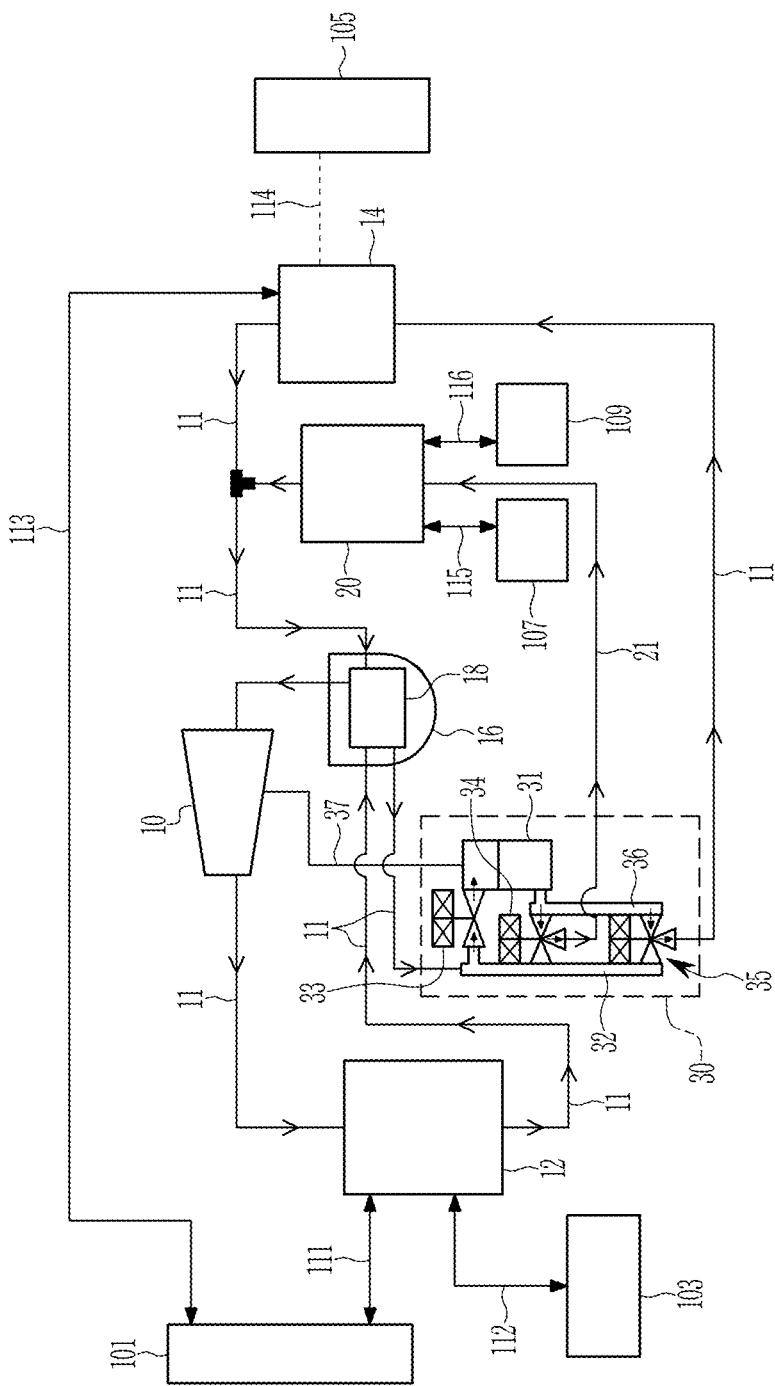
FIG. 5 illustrates an operational state diagram for a case in which a gas-liquid separator is operated and a waste heat is recovered from an external heat source, an electrical component, and a battery module in a heating mode of a vehicle in a heat pump system for the vehicle according to an embodiment of the present invention.

FIG. 5 illustrates an operational state diagram for a case in which a gas-liquid separator is operated and a waste heat is recovered from an external heat source, an electrical component, and a battery module in a heating mode of a vehicle in a heat pump system for the vehicle according to an embodiment of the present invention.

Referring to FIG. 5, the heat pump system may absorb the external heat source from the external air together with the waste heat of the electrical component 107 and the waste heat of the battery module 109 in the state where the gas injection device 30 is operated.

That is, when the gas injection device 30 is operated in the heating mode of the vehicle, the first expansion valve 33 expands the refrigerant supplied through the supply part 32 to the gas injection device 30.

Herein, the supply line 37 is opened. Accordingly, the gas-liquid separator 31 may supply the gaseous refrigerant among the introduced refrigerant to the compressor 10 through the opened supply line 37.

That is, the gas injection device 30 flows the gaseous refrigerant heat-exchanged while passing through the gas-liquid separator 31 back into the compressor 19 through the supply line 37, thereby increasing the flow rate of the refrigerant circulating in the refrigerant line 11.

At the same time, the second expansion valve 34 may expand the refrigerant supplied from the gas-liquid separator 31 through the discharge part 36 to flow into the refrigerant connection line 21 connected to the chiller 20.

The refrigerant introduced into the refrigerant connection line 21 may be introduced into the chiller 20. The refrigerant introduced into the chiller 20 may cool the coolant while heat-exchanging with the coolant supplied from the electrical component 107 through the fifth line 115 and the coolant supplied from the battery module 109 through the sixth line 116.

At this time, the temperature of the coolant may increase by recovering waste heat from the electrical component 107 and the battery module 109 while cooling the electrical component 107 and the battery module 109. The coolant whose temperature has risen through this operation may be supplied to the chiller 20.

Herein, the chiller 20 may recover the waste heat of the electrical component 107 and the battery module 109 while heat-exchanging the coolant supplied from the electrical component 107 and the battery module 109 through the fifth and sixth lines 115 and 116 with the refrigerant.

In addition, the third expansion valve 35 may expand the refrigerant supplied from the gas-liquid separator 31 through the discharge part 36 to flow into the refrigerant line 11.

The liquid refrigerant stored in the gas-liquid separator 31 may flow into the chiller 20 along the refrigerant connection line 21 in an expanded state through the operation of the second expansion valve 34.

In addition, the liquid refrigerant stored in the gas-liquid separator 31 may flow into the evaporator 14 along the refrigerant line 11 in an expanded state through the operation of the third expansion valve 35.

The refrigerant introduced into the evaporator 14 may be evaporated through heat-exchange with the coolant supplied from the radiator 101 through the third line 113.

At this time, the temperature of the coolant supplied to the evaporator 14 may be increased by absorbing the external heat source while passing through the radiator 101. The coolant whose temperature has risen through this operation may be supplied to the evaporator 14.

Herein, the evaporator 14 may recover the external heat source while heat-exchanging between the supplied coolant and the refrigerant.

Meanwhile, the refrigerant passing through the evaporator 14 and the chiller 20 may be introduced into the accumulator 16 and may be introduced into the compressor 10 after passing through the internal heat exchanger 18.

That is, the refrigerant passing through the accumulator 16 and the internal heat exchanger 18 and the refrigerant supplied from the gas-liquid separator 31 through the supply line 37 may be introduced into the compressor 10. The introduced refrigerant may be compressed by the operation of the compressor 10.

The refrigerant compressed in the compressor 10 is supplied to the condenser 12. At this time, the condenser 12 may condense the refrigerant by using the coolant supplied from the radiator 101 through the opened first line in.

In addition, the refrigerant introduced into the condenser 12 may be condensed while heat-exchanging with the coolant supplied from the heater core 103 through the second line 112.

Accordingly, the coolant whose temperature is increased through heat-exchange with the refrigerant in the condenser 12 may be supplied to the heater core 103.

The refrigerant condensed in the condenser 12 may pass through the internal heat exchanger 18 and be supplied to the gas injection device 30.

Herein, the external air introduced into the vehicle is converted into a high-temperature state through heat exchange with the high-temperature coolant introduced into the heater core 103 and introduced into the vehicle interior, thereby realizing the heating of the vehicle interior.

Accordingly, the refrigerant circulated in the heat pump system may smoothly recover the external heat source from the evaporator 14, and the waste heat from the coolant whose temperature has risen while passing through the electrical component 107 and the battery module 109 from the chiller 20, thereby improving heating performance and efficiency.

In addition, embodiments of the present invention may improve heating efficiency and performance while minimizing a use amount of a separate electric heater.

Furthermore, the gas injection device 30 may maximize the heating performance by increasing the flow rate of the refrigerant circulating in the refrigerant line 11.

On the other hand, in the present embodiment, the recovery of the external heat source and the waste heat of the electrical component 107 and the battery module 109 together is described as an embodiment, but it is not limited thereto, and any one or more of the external heat source, the waste heat of the electrical component 107, or the waste heat of the battery module 109 may be selectively recovered.

The operation for the case for not operating the gas-liquid separator 31 in the cooling mode of the vehicle in the heat pump system for the vehicle according to an embodiment of the present invention is described with reference to FIG. 6.

Figure 6:
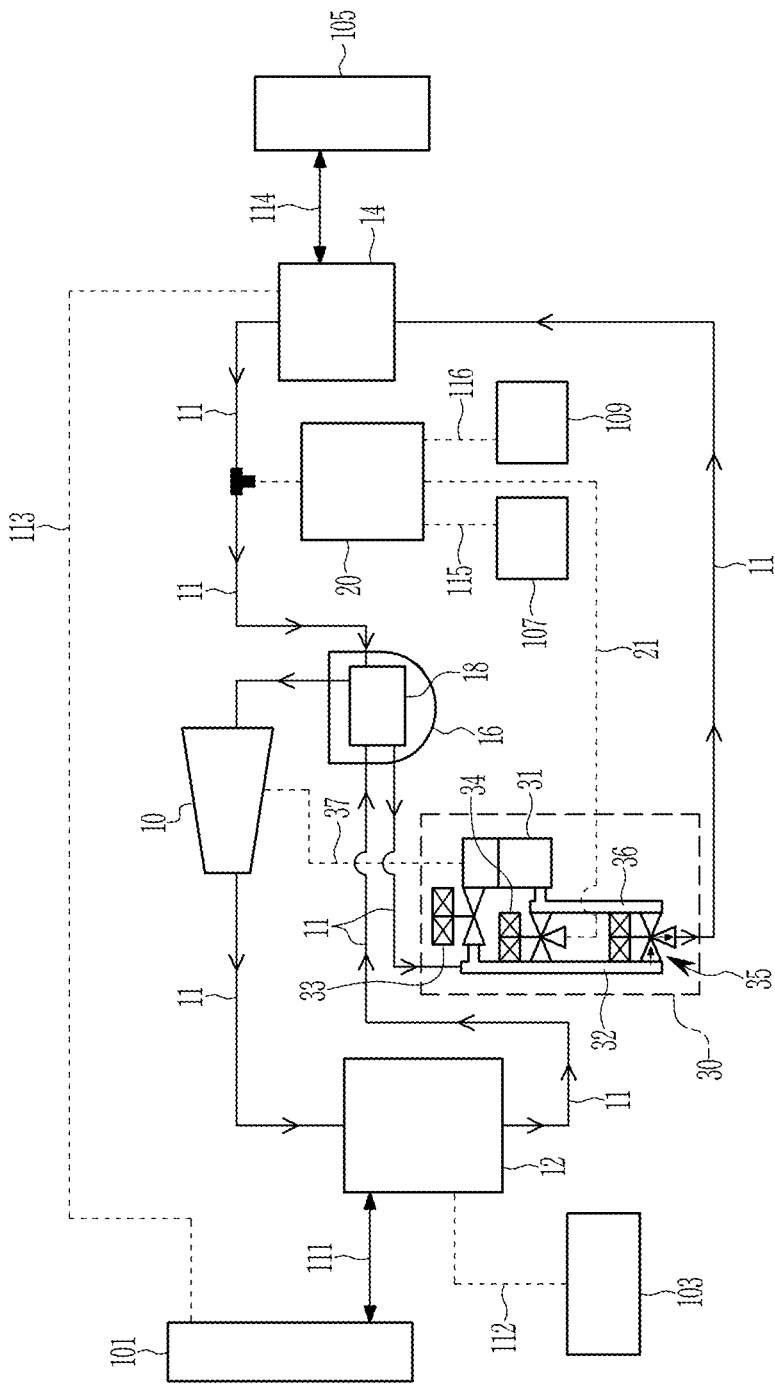
FIG. 6 illustrates an operational state diagram for a case in which a gas-liquid separator is not operated in a cooling mode of a vehicle in a heat pump system for the vehicle according to an embodiment of the present invention.

FIG. 6 illustrates an operational state diagram for a case in which a gas-liquid separator is not operated in a cooling mode of a vehicle in a heat pump system for the vehicle according to an embodiment of the present invention.

Referring to FIG. 6, when the gas injection device 30 is not operated in the cooling mode of the vehicle, the first and second expansion valves 33 and 34 are not operated.

Accordingly, the inflow of the refrigerant into the gas-liquid separator 71 may be blocked. At the same time, the supply line 37 may be closed.

The third expansion valve 35 may expand the refrigerant supplied from the condenser 12 through the supply part 32 to flow into the refrigerant line 11.

That is, the refrigerant introduced into the supply part 32 may flow into the evaporator 14 along the refrigerant line 11 in an expanded state through the operation of the third expansion valve 35.

The refrigerant introduced into the evaporator 14 may be evaporated through heat-exchange with the coolant supplied from the cabin cooler 105 through the fourth line 114.

Herein, the external air flowing into an interior of the vehicle is cooled through heat-exchange with the low-temperature coolant introducing into the cabin cooler 105. Accordingly, the cooled external air directly introduces into the interior of the vehicle, thereby cooling the interior of the vehicle.

Meanwhile, the refrigerant passing through the evaporator 14 may be introduced into the accumulator 16 and may be introduced into the compressor 10 after passing through the internal heat exchanger 18.

That is, the refrigerant passing through the accumulator 16 and the internal heat exchanger 18 may be introduced into the compressor 10. The introduced refrigerant may be compressed by the operation of the compressor 10.

The refrigerant compressed in the compressor 10 is supplied to the condenser 12. At this time, the condenser 12 may condense the refrigerant by using the coolant supplied from the radiator 101 through the opened first line in.

The refrigerant condensed in the condenser 12 may pass through the internal heat exchanger 18 and be supplied to the gas injection device 30.

The heat pump system according to an embodiment of the present invention may efficiently cool the interior of a vehicle while repeatedly performing the above-described process.

The operation for the case for not operating the gas-liquid separator 31 and recovering the waste heat of electrical component 107 in the heating mode of the vehicle in the heat pump system for the vehicle according to an embodiment of the present invention is described with reference to FIG. 7.

Figure 7:
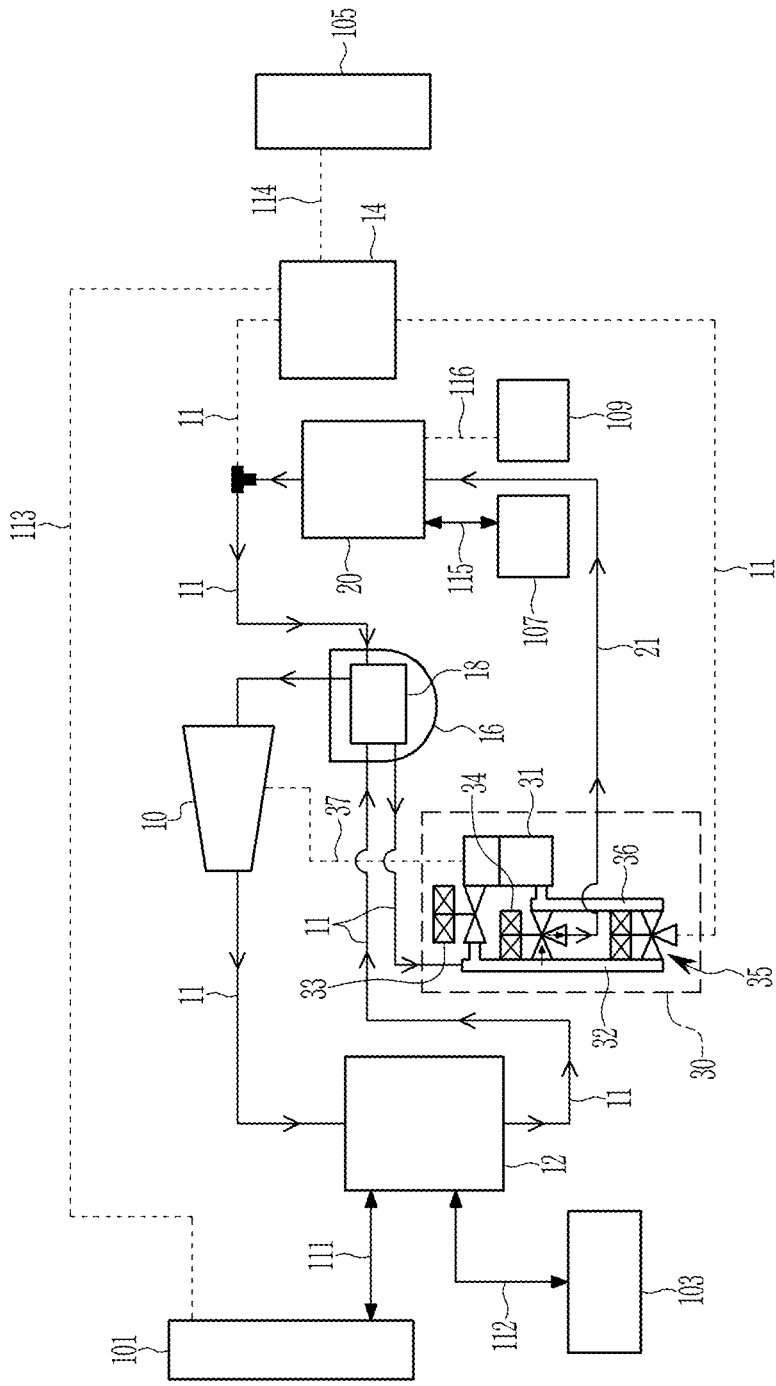
FIG. 7 illustrates an operational state diagram for a case in which a gas-liquid separator is not operated and a waste heat is recovered from electrical components in a heating mode of a vehicle in a heat pump system for the vehicle according to an embodiment of the present invention.

FIG. 7 illustrates an operational state diagram for a case in which a gas-liquid separator is not operated and a waste heat is recovered from electrical components in a heating mode of a vehicle in a heat pump system for the vehicle according to an embodiment of the present invention.

Referring to FIG. 7, when the gas injection device 30 is not operated in the heating mode of the vehicle, the first expansion valve 33 is not operated.

Accordingly, the inflow of the refrigerant into the gas-liquid separator 71 may be blocked. At the same time, the supply line 37 may be closed. In addition, the third expansion valve 35 may not be operated.

The second expansion valve 34 may expand the refrigerant supplied from the condenser 12 through the supply part 32 to flow into the refrigerant connection line 21.

The refrigerant introduced into the refrigerant connection line 21 may be introduced into the chiller 20. The refrigerant introduced into the chiller 20 may cool the coolant while heat-exchanging with the coolant supplied from the electrical component 107 through the fifth line 115.

At this time, the temperature of the coolant may increase by recovering waste heat from the electrical component 107 while cooling the electrical component 107. The coolant whose temperature has risen through this operation may be supplied to the chiller 20.

Herein, the chiller 20 may recover the waste heat of the electrical component 107 while heat-exchanging the coolant supplied from the electrical component 107 through the fifth line 115 with the refrigerant.

Meanwhile, the refrigerant passing through the chiller 20 may be introduced into the accumulator 16 and may be introduced into the compressor 10 after passing through the internal heat exchanger 18.

That is, the refrigerant passing through the accumulator 16 and the internal heat exchanger 18 may be introduced into the compressor 10. The introduced refrigerant may be compressed by the operation of the compressor 10.

The refrigerant compressed in the compressor 10 is supplied to the condenser 12. At this time, the condenser 12 may condense the refrigerant by using the coolant supplied from the radiator 101 through the opened first line in.

In addition, the refrigerant introduced into the condenser 12 may be condensed while heat-exchanging with the coolant supplied from the heater core 103 through the second line 112.

Accordingly, the coolant whose temperature is increased through heat-exchange with the refrigerant in the condenser 12 may be supplied to the heater core 103.

The refrigerant condensed in the condenser 12 may pass through the internal heat exchanger 18 and be supplied to the gas injection device 30.

Herein, the external air introduced into the vehicle is converted into a high-temperature state through heat exchange with the high-temperature coolant introduced into the heater core 103 and introduced into the vehicle interior, thereby realizing the heating of the vehicle interior.

Accordingly, the refrigerant circulated in the heat pump system may smoothly recover the waste heat from the coolant whose temperature has risen while passing through the electrical component 107 from the chiller 20, thereby improving heating performance and efficiency.

In addition, embodiments of the present invention may improve heating efficiency and performance while minimizing a use amount of a separate electric heater.

The operation for the case for not operating the gas-liquid separator 31 and recovering the external heat source, the waste heat of the electrical component 107, and the waste heat of the battery module 109 in the heating mode of the vehicle in the heat pump system for the vehicle according to an embodiment of the present invention is described with reference to FIG. 8.

Figure 8:
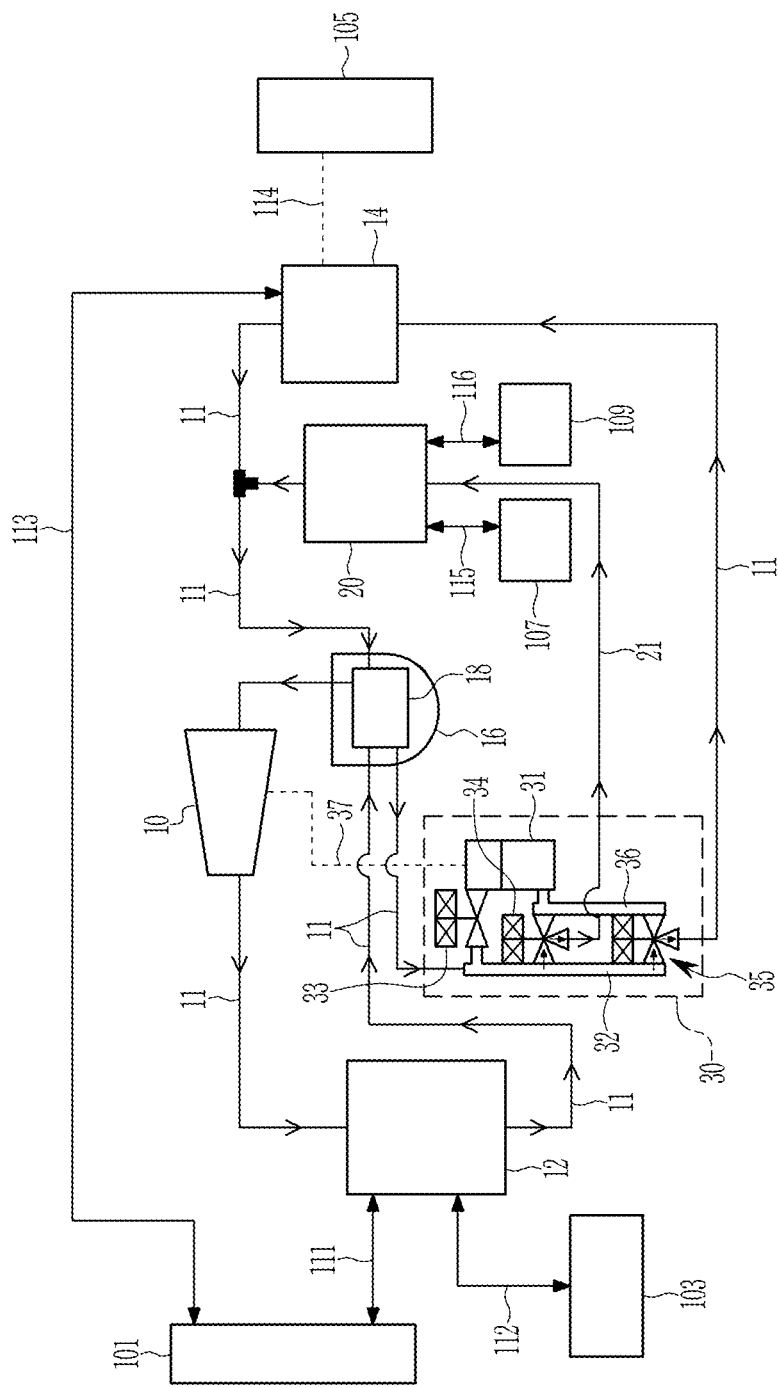
FIG. 8 illustrates an operational state diagram for a case in which a gas-liquid separator is not operated and a waste heat is recovered from an external heat source, an electrical component, and a battery module in a heating mode of a vehicle in a heat pump system for the vehicle according to an embodiment of the present invention.

FIG. 8 illustrates an operational state diagram for a case in which a gas-liquid separator is not operated and a waste heat is recovered from an external heat source, an electrical component, and a battery module in a heating mode of a vehicle in a heat pump system for the vehicle according to an embodiment of the present invention.

Referring to FIG. 8, the heat pump system may absorb the external heat source from the external air together with the waste heat of the electrical component 107 and the waste heat of the battery module 109 in the state where the gas injection device 30 is not operated.

That is, when the gas injection device 30 is not operated in the heating mode of the vehicle, the first expansion valve 33 is not operated.

Accordingly, the inflow of the refrigerant into the gas-liquid separator 71 may be blocked. At the same time, the supply line 37 may be closed.

The second expansion valve 34 may expand the refrigerant supplied from the supply pall 32 to flow into the refrigerant connection line 21 connected to the chiller 20.

The refrigerant introduced into the refrigerant connection line 21 may be introduced into the chiller 20. The refrigerant introduced into the chiller 20 may cool the coolant while heat-exchanging with the coolant supplied from the electrical component 107 through the fifth line 115 and the coolant supplied from the battery module 109 through the sixth line 116.

At this time, the temperature of the coolant may increase by recovering waste heat from the electrical component 107 and the battery module 109 while cooling the electrical component 107 and the battery module 109. The coolant whose temperature has risen through this operation may be supplied to the chiller 20.

Herein, the chiller 20 may recover the waste heat of the electrical component 107 and the battery module 109 while heat-exchanging the coolant supplied from the electrical component 107 and the battery module 109 through the fifth and sixth lines 115 and 116 with the refrigerant.

In addition, the third expansion valve 35 may expand the refrigerant supplied through the supply part 32 to flow into the refrigerant line 11.

That is, the refrigerant introduced into the supply part 32 may flow into the chiller 20 along the refrigerant connection line 21 in an expanded state through the operation of the second expansion valve 34.

In addition, the refrigerant introduced into the supply part 32 may flow into the evaporator 14 along the refrigerant line 11 in an expanded state through the operation of the third expansion valve 35.

The refrigerant introduced into the evaporator 14 may be evaporated through heat-exchange with the coolant supplied from the radiator 101 through the third line 113.

At this time, the temperature of the coolant supplied to the evaporator 14 may be increased by absorbing the external heat source while passing through the radiator 101. The coolant whose temperature has risen through this operation may be supplied to the evaporator 14.

Herein, the evaporator 14 may recover the external heat source while heat-exchanging between the supplied coolant and the refrigerant.

Meanwhile, the refrigerant passing through the evaporator 14 and the chiller 20 may be introduced into the accumulator 16 and may be introduced into the compressor 10 after passing through the internal heat exchanger 18.

That is, the refrigerant passing through the accumulator 16 and the internal heat exchanger 18 may be introduced into the compressor 10. The introduced refrigerant may be compressed by the operation of the compressor 10.

The refrigerant compressed in the compressor 10 is supplied to the condenser 12. At this time, the condenser 12 may condense the refrigerant by using the coolant supplied from the radiator 101 through the opened first line in.

In addition, the refrigerant introduced into the condenser 12 may be condensed while heat-exchanging with the coolant supplied from the heater core 103 through the second line 112.

Accordingly, the coolant whose temperature is increased through heat-exchange with the refrigerant in the condenser 12 may be supplied to the heater core 103.

The refrigerant condensed in the condenser 12 may pass through the internal heat exchanger 18 and be supplied to the gas injection device 30.

Herein, the external air introduced into the vehicle is converted into a high-temperature state through heat exchange with the high-temperature coolant introduced into the heater core 103 and introduced into the vehicle interior, thereby realizing the heating of the vehicle interior.

Accordingly, the refrigerant circulated in the heat pump system may smoothly recover the external heat source from the evaporator 14 and the waste heat from the coolant whose temperature has risen while passing through the electrical component 107 and the battery module 109 from the chiller 20, thereby improving heating performance and efficiency.

In addition, embodiments of the present invention may improve heating efficiency and performance while minimizing a use amount of a separate electric heater.

On the other hand, in the present embodiment, the recovery of the external heat source and the waste heat of the electrical component 107 and the battery module 109 together is described as an embodiment, but it is not limited thereto, and any one or more of the external heat source, the waste heat of the electrical component 107, or the waste heat of the battery module 109 may be selectively recovered.

Accordingly, as described above, when the heat pump system for the vehicle according to an embodiment of the present invention is applied, the waste heat of the electrical component 107 may be recovered according to the air conditioning mode of the vehicle using one chiller 20 in which cooling water and a refrigerant heat-exchange, and the temperature of the battery module 109 may be adjusted.

In addition, according to an embodiment of the present invention, there may be improvement of cooling and heating performance by increasing a flow rate of the refrigerant by applying the gas injection device 30 that selectively operates in an air conditioning mode of a selected vehicle interior.

In addition, embodiments of the present invention may simplify the system by minimizing components and maximizing system performance by using the gas injection device 30.

In addition, embodiments of the present invention may operate the battery module 109 in an optimum performance state by efficiently controlling the temperature of the battery module 109, and the total traveling distance of the vehicle may be increased through the efficient management of the battery module 109.

In addition, embodiments of the present invention may improve heating efficiency by selectively using the external heat source or the waste heat of the electrical component 107 and the battery module 109 in the heating mode of the vehicle.

Furthermore, according to the embodiments of the present invention, it is possible to reduce manufacturing cost and weight through simplification of an entire system and to improve space utilization.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A heat pump system for a vehicle, the heat pump system comprising:
   a cooling apparatus comprising a radiator, an electrical component, and a battery module in which a coolant is circulated;
   a compressor configured to compress a refrigerant;
   a condenser connected to the compressor through a refrigerant line and configured to condense the refrigerant by heat-exchanging with the refrigerant supplied from the compressor and the coolant supplied from the cooling apparatus;
   an evaporator connected to the condenser through the refrigerant line and configured to evaporate the refrigerant by heat-exchanging with the refrigerant supplied from the condenser and the coolant supplied from the cooling apparatus;
   a gas injection device provided in the refrigerant line between the condenser and the evaporator and configured to selectively expand and flow the refrigerant supplied from the condenser and to selectively supply some of the supplied refrigerant to the compressor to increase a flow rate of the refrigerant circulating in the refrigerant line;
   a refrigerant connection line including a first end connected to the refrigerant line and a second end connected to the gas injection device between the compressor and the evaporator; and
   a chiller provided in the refrigerant connection line and configured to adjust a temperature of the coolant by heat-exchanging the refrigerant introduced into the refrigerant connection line with the selectively introduced coolant.

2. The heat pump system of claim 1, wherein the gas injection device comprises:
   a gas-liquid separator configured to separate and selectively discharge gaseous refrigerant and liquid refrigerant from among the refrigerants introduced into an interior;
   a supply part connected to the condenser through the refrigerant line such that the refrigerant supplied from the condenser inflows;
   a first expansion valve provided between the gas-liquid separator and the supply part and configured to selectively expand the refrigerant supplied to the supply part to be supplied to the gas-liquid separator;
   a second expansion valve provided between the gas-liquid separator and the supply part and configured to selectively expand the refrigerant supplied to the supply part to be supplied to the chiller or to supply the refrigerant supplied from the gas-liquid separator to the chiller;
   a third expansion valve provided between the gas-liquid separator and the supply part and configured to selectively expand the refrigerant supplied to the supply part to be supplied to the evaporator or to supply the refrigerant supplied from the gas-liquid separator to the evaporator;
   a discharge part connecting the gas-liquid separator to the second expansion valve and the third expansion valve so as to discharge the refrigerant from the gas-liquid separator to the second expansion valve or the third expansion valve; and
   a supply line connecting the gas-liquid separator and the compressor and configured to selectively supply the refrigerant in a gaseous state from the gas-liquid separator to the compressor.

3. The heat pump system of claim 2, wherein the second expansion valve and the third expansion valve are arranged in parallel with the first expansion valve through the supply part and the discharge part.

4. The heat pump system of claim 2, further comprising:
an accumulator provided in the refrigerant line between the evaporator and the compressor; and
an internal heat exchanger provided inside the accumulator and connected to a portion of the refrigerant line connecting the condenser and the gas injection device and a portion of the refrigerant line connecting the evaporator and the compressor, respectively.

5. The heat pump system of claim 4, wherein the internal heat exchanger is configured to:
heat-exchange the refrigerant condensed in the condenser and a low-temperature refrigerant discharged from the evaporator; and
supply each heat-exchanged refrigerant to the gas injection device and the compressor, respectively.

6. The heat pump system of claim 2, wherein the first, second and third expansion valves are configured to selectively operate in an air conditioning mode of the vehicle including a cooling mode, a heating mode, and a dehumidifying mode, and to selectively expand the refrigerant while controlling the flow of the refrigerant.

7. The heat pump system of claim 2, wherein the gas-liquid separator is configured to be operated when the first expansion valve expands the refrigerant in an air conditioning mode of the vehicle and to increase a flow rate of the refrigerant circulating through the refrigerant line by supplying a gaseous refrigerant among the supplied refrigerant to the compressor through the supply line.

8. The heat pump system of claim 2, wherein, when the gas injection device is operated in a cooling mode of the vehicle:
the first expansion valve is configured to expand the refrigerant supplied through the supply part to the gas injection device;
the second expansion valve is not operated;
the third expansion valve is configured to expand the refrigerant supplied from the gas-liquid separator through the discharge part to flow into the refrigerant line;
the supply line is in an open state; and
the gas-liquid separator is configured to supply a gaseous refrigerant among the introduced refrigerant to the compressor through the supply line.

9. The heat pump system of claim 2, wherein, when the gas injection device is not operated in a cooling mode of the vehicle:
the first and second expansion valves are not operated;
the inflow of the refrigerant into the gas-liquid separator is blocked;
the third expansion valve is configured to expand the refrigerant supplied through the supply part and supply it to the evaporator through the refrigerant line; and
the supply line is in a closed state.

10. The heat pump system of claim 2, wherein, when the gas injection device is operated in a cooling mode of the vehicle and cools the battery module:
the first expansion valve is configured to expand the refrigerant supplied through the supply part to the gas injection device;
the second expansion valve is configured to expand the refrigerant supplied from the gas-liquid separator through the discharge part to flow into the refrigerant connection line connected to the chiller;
the third expansion valve is configured to expand the refrigerant supplied from the gas-liquid separator through the discharge part to flow into the refrigerant line;
the supply line is in an open state; and
the gas-liquid separator is configured to supply a gaseous refrigerant among the introduced refrigerant to the compressor through the supply line.

11. The heat pump system of claim 2, wherein, when the gas injection device is operated in a heating mode of the vehicle and recovers a waste heat of the electrical component:
the first expansion valve is configured to expand the refrigerant supplied through the supply part to the gas injection device;
the second expansion valve is configured to expand the refrigerant supplied from the gas-liquid separator through the discharge part to flow into the refrigerant connection line connected to the chiller;
the third expansion valve is not operated;
the supply line is in an open state; and
the gas-liquid separator is configured to supply a gaseous refrigerant among the introduced refrigerant to the compressor through the supply line.

12. The heat pump system of claim 2, wherein, when the gas injection device is not operated in a heating mode of the vehicle:
the first expansion valve is not operated;
the second expansion valve is configured to expand the refrigerant supplied through the supply part to flow into the refrigerant connection line connected to the chiller;
the third expansion valve is not operated;
the inflow of the refrigerant into the gas-liquid separator is blocked; and
the supply line is in a closed state.

13. The heat pump system of claim 2, wherein, when the gas injection device is not operated in a heating mode of the vehicle and recovers an external heat source and a waste heat of the electrical component and a waste heat of the battery module:
the first expansion valve is not operated;
the inflow of the refrigerant into the gas-liquid separator is blocked;
the second expansion valve is configured to expand the refrigerant supplied through the supply part to flow into the refrigerant connection line connected to the chiller;
the third expansion valve is configured to expand the refrigerant supplied through the supply part and supply it to the evaporator through the refrigerant line; and
the supply line is in a closed state.

14. The heat pump system of claim 2, wherein the first expansion valve is configured to selectively expand the refrigerant while controlling the flow of the refrigerant, and wherein the first expansion valve is a 2-way electronic expansion valve with one inlet and one outlet.

15. The heat pump system of claim 2, wherein the second expansion valve and the third expansion valve are configured to selectively expand the refrigerant while controlling the flow of the refrigerant, and wherein each of the second expansion valve and the third expansion valve is a 3-way electronic expansion valve with two inlets and one outlet.

16. A heat pump system for a vehicle, the heat pump system comprising:
a cooling apparatus comprising a radiator, an electrical component, and a battery module in which a coolant is circulated;

a compressor configured to compress a refrigerant;

a condenser connected to the compressor through a refrigerant line and configured to condense the refrigerant by heat-exchanging with the refrigerant supplied from the compressor and the coolant supplied from the cooling apparatus;

an evaporator connected to the condenser through the refrigerant line and configured to evaporate the refrigerant by heat-exchanging with the refrigerant supplied from the condenser and the coolant supplied from the cooling apparatus;

a gas injection device provided in the refrigerant line between the condenser and the evaporator and configured to selectively expand and flow the refrigerant supplied from the condenser and to selectively supply some of the supplied refrigerant to the compressor to increase a flow rate of the refrigerant circulating in the refrigerant line, wherein the gas injection device comprises:

a gas-liquid separator configured to separate and selectively discharge gaseous refrigerant and liquid refrigerant from among the refrigerants introduced into an interior;

a supply part connected to the condenser through the refrigerant line such that the refrigerant supplied from the condenser inflows;

a first expansion valve provided between the gas-liquid separator and the supply part and configured to selectively expand the refrigerant supplied to the supply part to be supplied to the gas-liquid separator;

a second expansion valve provided between the gas-liquid separator and the supply part and configured to selectively expand the refrigerant supplied to the supply part to be supplied to a chiller or to supply the refrigerant supplied from the gas-liquid separator to the chiller;

a third expansion valve provided between the gas-liquid separator and the supply part and configured to selectively expand the refrigerant supplied to the supply part to be supplied to the evaporator or to supply the refrigerant supplied from the gas-liquid separator to the evaporator;

a discharge part connecting the gas-liquid separator to the second expansion valve and the third expansion valve so as to discharge the refrigerant from the gas-liquid separator to the second expansion valve or the third expansion valve; and a supply line connecting the gas-liquid separator and the compressor and configured to selectively supply the refrigerant in a gaseous state from the gas-liquid separator to the compressor;

a refrigerant connection line including a first end connected to the refrigerant line and a second end connected to the gas injection device between the compressor and the evaporator; and the chiller provided in the refrigerant connection line and configured to adjust a temperature of the coolant by heat-exchanging the refrigerant introduced into the refrigerant connection line with the selectively introduced coolant;

wherein the condenser is connected to the radiator through a first line through which the coolant circulates and is connected to a heater core through a second line through which the coolant circulates;

wherein the evaporator is connected to the radiator through a third line through which the coolant circulates and is connected to a cabin cooler through a fourth line through which the coolant circulates; and wherein the chiller is connected to the electrical component through a fifth line through which the coolant circulates and is connected to the battery module through a sixth line through which the coolant circulates.

17. The heat pump system of claim 16, wherein:

the first line is always in an open state so as to supply coolant to the condenser in a cooling mode, a heating mode, and a dehumidifying mode of the vehicle; and the second line is an open state so as to connect the condenser and the heater core in the heating mode of the vehicle.

18. The heat pump system of claim 16, wherein:

the third line is in an open state so as to connect the radiator and the evaporator when an external heat source is recovered in a heating mode of the vehicle; and the fourth line is in an open state so as to connect the evaporator and the cabin cooler in a cooling mode of the vehicle.

19. The heat pump system of claim 16, wherein:

the fifth line is in an open state so as to connect the chiller and the electrical component when a waste heat of the electrical component is recovered in a heating mode of the vehicle; and the sixth line is in an open state so as to connect the chiller and the battery module when the battery module is cooled in a cooling mode of the vehicle or when a waste heat of the battery module is recovered in the heating mode of the vehicle.

* * * * *